US012591585B2

(12) United States Patent     (10) Patent No.: US 12,591,585 B2

Hickey et al.     (45) Date of Patent: Mar. 31, 2026

(54) SYSTEMS AND METHODS FOR ADVANCED ENTERPRISE DATA STORAGE AND RETRIEVAL

(71) Applicant: State Farm Mutual Automobile Insurance Company, Bloomington, IL (US)

(72) Inventors: Sean Hickey, Garland, TX (US); Olivia Nauman, Phoenix, AZ (US); Molly Bonney, Mabank, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/748,417

(22) Filed: Jun. 20, 2024

(65) Prior Publication Data

US 2025/0061122 A1     Feb. 20, 2025

Related U.S. Application Data

(60) Provisional application No. 63/512,410, filed on Jul. 7, 2023.

(51) Int. Cl.
*G06F 16/248* (2019.01)
*G06F 16/383* (2019.01)

(52) U.S. Cl.
CPC .......... *G06F 16/248* (2019.01); *G06F 16/383* (2019.01)

(58) Field of Classification Search
CPC ................................. G06F 16/24; G06F 16/38
See application file for complete search history.

(56) References Cited

U.S. PATENT DOCUMENTS

| | | | |
|---|---|---|---|
| 7,788,123 B1 | 8/2010 | Ekhaus et al. | |
| 10,311,058 B1 | 6/2019 | Kumar | |
| 2016/0117604 A1 * | 4/2016 | Frosst ...................... | G06N 5/02 |
| | | | 706/12 |
| 2019/0220752 A1 | 7/2019 | Xu et al. | |
| 2023/0103076 A1 * | 3/2023 | Zhou ..................... | G06F 16/383 |
| | | | 726/1 |
| 2024/0046117 A1 * | 2/2024 | Rawat ................. | G06F 16/9027 |
| 2024/0146734 A1 | 5/2024 | Southgate et al. | |
| 2024/0265045 A1 * | 8/2024 | De Oliveira ........ | G06F 11/0736 |

FOREIGN PATENT DOCUMENTS

CN     117520518 A     2/2024

* cited by examiner

*Primary Examiner* — Maher N Algibhah

(74) *Attorney, Agent, or Firm* — Armstrong Teasdale LLP

(57)     ABSTRACT

A computer system is provided and is programmed to: (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4) receive a request for access to the first dataset, wherein the request for access includes one or more database operations to be performed on the first dataset; (5) access the first dataset; and/or (6) execute the one or more database operations on the first dataset to provide results to the user computer device.

23 Claims, 11 Drawing Sheets

Data Catalog
Inventory of datasets available for sharing within the Labs AWS environment New Catalog Entry    1040

~1000

≡ COLUMNS ⇆ FILTERS ≡ DENSITY ⬇ EXPORT 1015    1020   1025   1030   1035

| Dataset Name | Description | Status | Contact | Account | Environment | Consumers | Actions |
|---|---|---|---|---|---|---|---|
| Cape Analytics ~1005 | Residential data containing public record data as well as some inferred/modeled features. Lim... | active | kchw | digiProp ProfProto | prototype | 4 | ... |
| CV-Countertop labels | This dataset contains publicly licensed images of kitchen and bathroom countertops of differe... | active | mxg8 | computer VisionProto | prototype | 2 | ... |
| Estated Parcel Data | Public record parcel data acquired through Estated. Data currently available for IL, MO, and TX.... | active | kchw | digiProp ProfProto | prototype | 3 | ... |
| Estated Metadata | Public record metadata acquired through Estated indicating date received from the county. Dat... | active | kchw | digiProp ProfProto | prototype | 1 | ... |
| Product Data | This is a data set produced by Product Management Practices and contains information about... | active | hsp4 | dataAuditing MasterPro... | prodx | 0 | ... |
| Estated Assessments Data | Public record assessment data acquired through Estated and used for taxation purposes. Data... | active | kchw | digiProp ProfProto | prototype | 1 | ... |
| Estated Tax Data | Public record tax data acquired though Estated. Data currently available for IL, MO, and TX. Sc... | active | kchw | digiProp ProfProto | prototype | 1 | ... |
| Historic Texas Hail CAT Da... | Hail sized intensity mapping from the SFMP in GEOJson format for the State of Texas based on... | active | hdbg | contextual DataProto | prototype | 0 | ... |
| Estated Address Data | Public record address data acquired through Estated. Data currently available for IL, MO, and T... | active | kchw | digiProp ProfProto | prototype | 2 | ... |
| Estated Other Areas Data | Public record data acquired through Estated listing areas within the building, and their size in s... | active | kchw | digiProp ProfProto | prototype | 1 | ... |
| US Census Bureau Data | Various demographic and household datasets from Census.gov pulled on January 2023 for all... | active | nop4 | contextual DataProto | prototype | 0 | ... |
| Census gov TIGER/Line Co... | Mapped data files showing county lines, zip code areas, and elementary and secondary school... | active | kchw | contextual DataProto | prototype | 0 | ... |

SYSTEMS AND METHODS FOR ADVANCED ENTERPRISE DATA STORAGE AND RETRIEVAL

CROSS-REFERENCE TO RELATED APPLICATIONS

This application claims priority to U.S. Provisional Patent Application No. 63/512,410, filed Jul. 7, 2023, the entire contents and disclosure of which are hereby incorporated herein by reference in their entirety.

FIELD OF INVENTION

The field of the invention relates generally to advanced enterprise data storage and retrieval, and more particularly, to a network-based system and method for coordinating and retrieving datasets from a plurality of different databases while storing and providing standardized knowledge base data about those datasets.

BACKGROUND

In many enterprise level endeavors, there is a large amount of data generated by multiple different groups of people within the enterprise. This includes groups of people that are located in different geographic locations. Most of these groups of people store their generated data in data locations based upon their geographic location or the group that they are a part of. For example, group A may be located in Illinois and store their data on a production server, while group B may be located in California and store their data on a research server. The individuals in these two groups may not have access to the other's servers.

In many cases, it is difficult and resource consuming to store all of the generated datasets in a central location. And with the datasets being located in different computer systems and/or databases, it is difficult for individual users to discover and access datasets that may be useful to them unless they already know about the content and location of the desired datasets.

Furthermore, individuals from different groups within the enterprise may have needs for some of the data generated by other groups. For example, persons of group A within an enterprise may have developed a dataset or used a dataset for a particular project; while persons of group B within the same enterprise may need to use some of the same data of the dataset for a different project. It would be useful to have a system to allow the persons of group B to easily discover and determine whether or not to use the datasets of group A or from another group from the enterprise for their new project. Conventional techniques may include additional inefficiencies, ineffectiveness, encumbrances, and drawbacks as well.

BRIEF SUMMARY

The present embodiments of the systems and methods described herein relate to, inter alia, advanced enterprise data storage and retrieval. A document storage and access system, as described herein, may include a document storage and access ("DSA") computer device that is in communication with a user computer device. The DSA computer device may be configured to: (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4) receive, from the user computer device, a request for access to the first dataset, wherein the request for access includes one or more database operations to be performed on the first dataset; (5) access, via a first database server, the first dataset; and/or (6) execute the one or more database operations on the first dataset to provide results to the user computer device.

In one aspect, a computer system for advanced enterprise data storage and retrieval may be provided. The computer system may (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4) receive, from the user computer device, a request for access to the first dataset, wherein the request for access includes one or more database operations to be performed on the first dataset; (5) access, via a first database server, the first dataset; and/or (6) execute the one or more database operations on the first dataset to provide results to the user computer device. The computer system may have additional, less, or alternate functionality, including that discussed elsewhere herein.

In another aspect, a computer-implemented method for advanced enterprise data storage and retrieval may be provided. The method may include, such as via one or more local or remote processors, servers, transceivers, and memory units, configured for wireless communication and/or data transmission over one or more radio frequency links: (1) storing, in a first database, knowledge base data sets for each of a plurality of datasets, wherein each knowledge base data set includes at least data relating to the use of the associated dataset and a link to a separate database storing the corresponding dataset; (2) receiving, at the first database from a user computer device, a request for knowledge base data for a first dataset; (3) instructing the user computer device to display the knowledge base data for the first dataset; (4) receiving, from the user computer device, a request for access to the first dataset, wherein the request for access includes one or more database operations to be performed on the first dataset; (5) accessing, via a first database server, the first dataset; and/or (6) executing the one or more database operations on the first dataset to provide results to the user computer device. The method may include additional, less, or alternate actions, including those discussed elsewhere herein.

In a further aspect, at least one non-transitory computer-readable media having computer-executable instructions embodied thereon may be provided. When executed by a computing device including at least one processor in communication with at least one memory device, the computer-executable instructions may cause the at least one processor to: (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4)

receive, from the user computer device, a request for access to the first dataset, wherein the request for access includes one or more database operations to be performed on the first dataset; (5) access, via a first database server, the first dataset; and/or (6) execute the one or more database operations on the first dataset to provide results to the user computer device. The computer-executable instructions may direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 10 illustrates an exemplary dataset listing of knowledge base data for the data storage and access system shown in FIG. 7.

Figure 1:
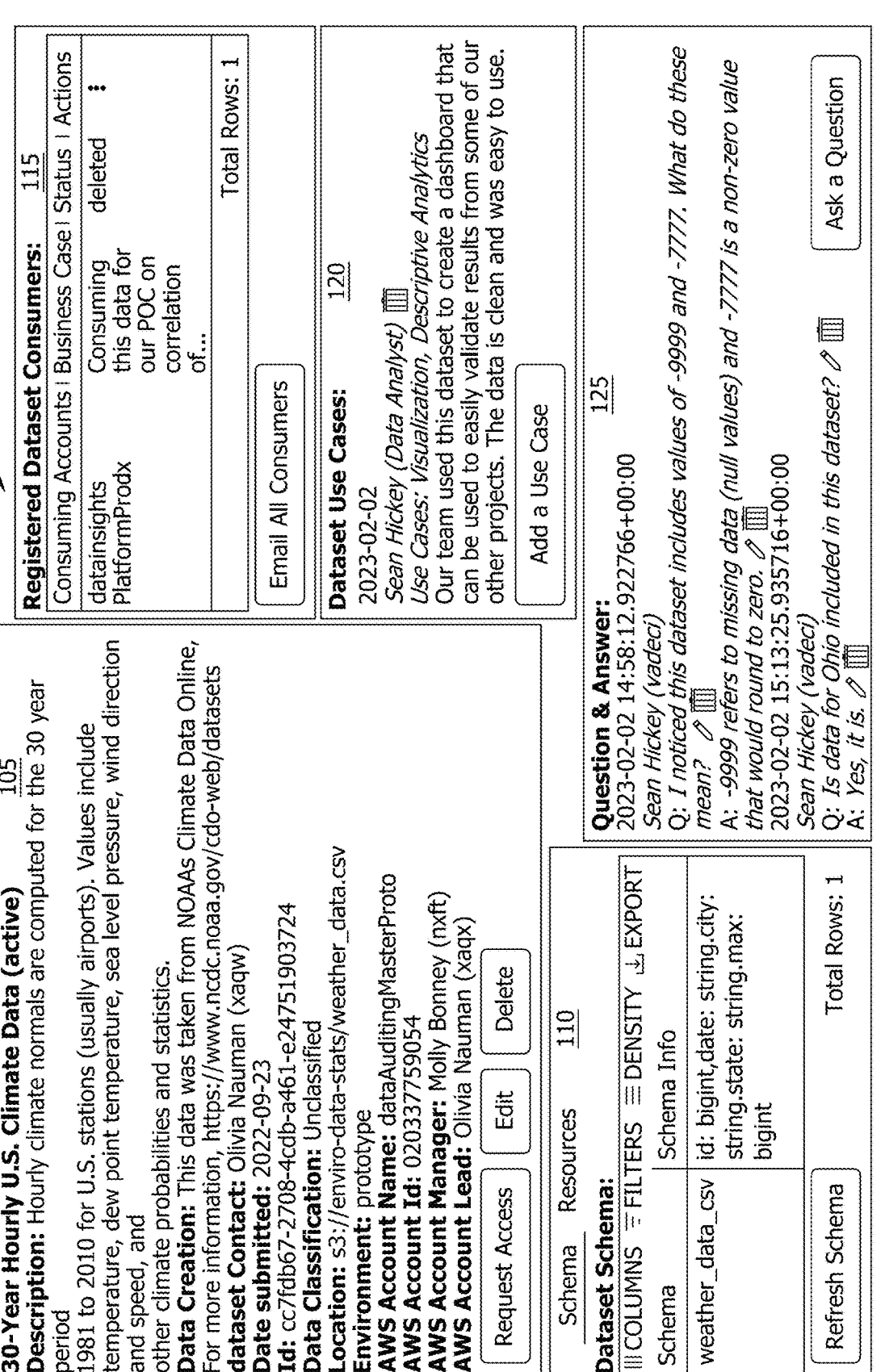
FIG. 1 is an exemplary screenshot of an example user interface of knowledge base data for a document storage and access system illustrated in FIG. 7.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, systems and methods for network-based system and method for coordinating and retrieving datasets from a plurality of different databases while storing and providing standardized knowledge base data about those datasets. A data storage and access system, as described herein, may include a Data Storage and Access ("DSA") computer device that is in communication with a plurality of user computer devices. In an exemplary embodiment, the process is performed by Data Storage and Access ("DSA") computer device, also known as a Data Storage and Access ("DSA") server.

In the exemplary embodiment, one or more user's desire to store datasets for access by other users in an enterprise. In the exemplary embodiment, the datasets may have been used for research, artificial intelligence training and/or testing, analysis, fraud detection, and/or other data use purpose. The DSA server is programmed to store knowledge base data about the datasets including links to where the datasets are stored. This allows for a central location for users in the enterprise to search for and access datasets.

The DSA system executes an application that facilitates the finding and sharing of data between teams. The application includes a collection of features that promote and facilitate knowledge-sharing and community-based, crowd-sourced learning around data concepts and datasets shared. In at least one embodiment, the DSA system may act as a data marketplace for its users. The DSA system provides the public forum for data users (data producers and consumers) and uses the information shared in the public forum (via machine learning and analytics) to better inform its users about the data offered and to make recommendations to its users about its findings.

The DSA system is configured to allow for connecting users to exponentially sourced information to get the power of contribution and consumption of this data into the hands of users and creators to make informed decisions about the data. The DSA system provides knowledge base data about the datasets to inform the potential users. The DSA system then allows users to shop data for their needs. The DSA system allows data creators to share their data along with an explanation of what the data is meant for, where the data is sourced from, and any key information about the data. For example, is it good to know the financial numbers within are from an actuary perspective or determined by certain formulas. The users can then review the knowledge base data provided about the data to determine if they could use this data.

In some additional embodiments, the DSA system and the knowledge base data also allows users to measure insights about the datasets. For example, what data is being used the most? What is the data's rating? Who is best served by the data? The answers to these questions may allow the DSA system to determine the most appropriate data in different situations and then present that data to the most appropriate users.

In the example embodiment, the DSA server stores in the knowledge base data an overview of each dataset. The overview includes a plurality of information about the dataset, including, but not limited to, a description of the dataset, date of dataset creation, date dataset was submitted, one or more contacts for the dataset, one or more identifiers for the dataset, current location of the dataset, dataset environment, account information for the dataset, and/or any other information needed for an overview. Some other features of the DSA system and the knowledge base data include, but are not limited to, Use Cases (Feedback), Questions and Answers, Asset Insights, and/or machine learning (ML) engine. The Use Case (also known as Feedback) section is where users can offer feedback and or examples of their usage/experiences with the data. The Question & Answer section allows users to ask questions publicly and receive a direct response from the data providers. The Asset Insights section displays aggregated metadata about dataset usage (Who uses it?, How's it used?, etc.). The ML Engine data collected by the DSA system to make recommendations to users and/or provide sentiment analysis on feedback.

In at least one embodiment, the DSA system provides the features described herein by three phases: a data creation phase, a summation phase, and a machine learning (ML) phase. In the data creation phase, the DSA system creates and/or facilitates a public forum for data user. This includes the Question & Answer, the use cases, the code sharing, and the access patterns, as described herein. In the summation phase, the DSA system determines asset insights by aggregating and displaying the findings from the public forum and data mesh to better understand the dataset usage and explore trends. In the ML phase, the DSA system makes recommendations to the users based upon the metadata collected and processed. The ML phase includes using ML to generate recommendations, tag data and metadata, cluster data, and perform sentiment analysis.

The Question & Answer section allows users to ask questions regarding datasets and receive answers directly from data providers. In many cases, data users often encounter roadblocks commonly faced by others when wrangling datasets. The Q&A section facilitates a public forum that users can go to ask dataset-specific questions and receive answers directly from data providers (or other data users). Rather than limiting this type of communication to private chats, calls or emails, the DSA system stores and provides the information in the knowledge base data for all to benefit. The Q&A section breaks down barriers between data users and data providers. The Q&A section also facilitates the sharing of data knowledge between data users. In some embodiments, the DSA system allows any user to answer questions, not just the data provider.

One example Q&A set may include: "Q: I noticed that this dataset includes values of −9999 and −7777. What do these values mean?" and "A: −9999 refers to missing data (null values) and −7777 is a non-zero value that would round to zero." Another example Q&A set may include "Q: Is data for Ohio included in this dataset?" and "A: Yes, it is." In some embodiments, the DSA system may allow users to edit and/or delete their questions and/or answers.

The Use Case (Feedback) section provides examples of how different users used the data and/or provides feedback to data providers and other data users. Frequent users of datasets gain knowledge about datasets that is often never communicated or only communicated through non-public channels. The Use Case (Feedback) section facilitates the sharing of data knowledge between data users. The Use Case (Feedback) section generates and proliferates crowd-sourced ideas. The use Case (Feedback) section shares the lessons of other people's successes and failures. In some embodiments, the DSA system allows for users to upvote/downvote (thumbs up/thumbs down) use cases and/or feedback. In some further embodiments, the DSA system allows for users to share their code/analysis with other users.

One example of use case/feedback may include comments such as "Our team used this dataset to create a dashboard that can be used to easily validate results from some of our other projects. The data is clean and was easy to use."

The Asset Insights section collects and aggregates metadata about datasets (and their usage). The Asset Insights section displays this information on the user interface (UI). The Asset Insights section uses this information to make recommendations to users. While providing individual-level anecdotes regarding dataset usage is valuable, there is also great benefit to viewing asset usage in aggregation. Analyzing metadata in aggregate can help expedite understanding and lead to more agile work. The Asset Insights section provides information, such as, but not limited to, who is using the data, how the data is being used, what services are using the data, and to recommend other datasets. In some embodiments, the DSA system may perform sentiment analysis on Use Cases. In additional embodiments, the DSA system may generate tags/categorize dataset to be used for recommendations. In still additional embodiments, the DSA system may automate how the data is being used by leveraging a code analysis system or service, such as, but not limited to, ChatGPT.

The machine learning engine use ML to process text in Use Cases. In at least one embodiment, the ML engine analyzes the Product Descriptions of different datasets. In another embodiments, the ML engine performs sentiment analysis on the Use Cases. In a further embodiment, the ML engine generates tags/categorize dataset to help generate recommendations for other datasets. In some embodiments, the DSA system uses machine learning (ML) and artificial intelligence (AI) to explore how the code is being leveraged. In some of these embodiments, the DSA system uses ChatGPT and natural language processing (NLP) to further analyze the code. The DSA system and/or the ML engine determine what languages are used, whether models are built with the data, is the data visualized, is the data summarized, and/or any other questions and/or analysis desired. In at least one embodiment, the DSA system aggregates the findings for display on the UI. The DSA system may also send reports to data providers and/or create recommendations for users.

At least one of the technical problems addressed by this system may include: (i) providing a central location for sharing and accessing a plurality of information; (ii) improving indexing and accessing related information; (iii) improved speed and/or efficiency of searching and/or filtering data; (iv) reduced time for data queries; (v) improved retrieval of information; and/or (vi) secure storage of information.

The methods and systems described herein may be implemented by performing one of more of the steps of a) store, in a first database, knowledge base data sets for each of a plurality of datasets, wherein each knowledge base data set includes at least data relating to the use of the associated dataset and a link to a separate database storing the corresponding dataset; b) receive, at the first database from a user computer device, a request for knowledge base data for a first dataset; c) instruct the user computer device to display the knowledge base data for the first dataset; d) receive, from the user computer device, a request for access to the first dataset, wherein the request for access includes one or more database operations to be performed on the first dataset; e) access, via a first database server, the first dataset; and f) execute the one or more database operations on the first dataset to provide results to the user computer device; g) instruct the user computer device to display the plurality of overview information for the first dataset, wherein the knowledge base data also includes a plurality of overview information for the corresponding dataset; h) instruct the user computer device to display the schema for the first dataset, wherein the knowledge base data also includes a schema for the corresponding dataset; i) wherein the knowledge base data also includes a list of consumers who have accessed the corresponding dataset; j) wherein the knowledge base data also includes one or more use cases where other users accessed the corresponding dataset; k) receive, via the user computer device, a question about the first dataset; l) route the question to a computer device associated with a data provider associated with the first dataset; m) receive a response for the question from the computer device associated with a data provider associated with the first dataset; n) provide the response to the user computer device; o) store the question and the response in the knowledge base data for the first dataset; p) instruct the user computer device to display the questions and answers for the first dataset, wherein the knowledge base data includes a plurality of questions and answers; q) analyze usage of the plurality of datasets to generate a plurality of usage information for the plurality of datasets; r) analyze the plurality of usage information to generate a recommendation model trained to provide one or more dataset recommendations based upon each dataset and the plurality of usage information; s) execute the recommendation model to generate one or more first dataset recommendations based upon the first dataset; and t) instruct the user computer device to display the one or more first dataset recommendations for the first dataset.

Exemplary Screenshots

Figure 7:
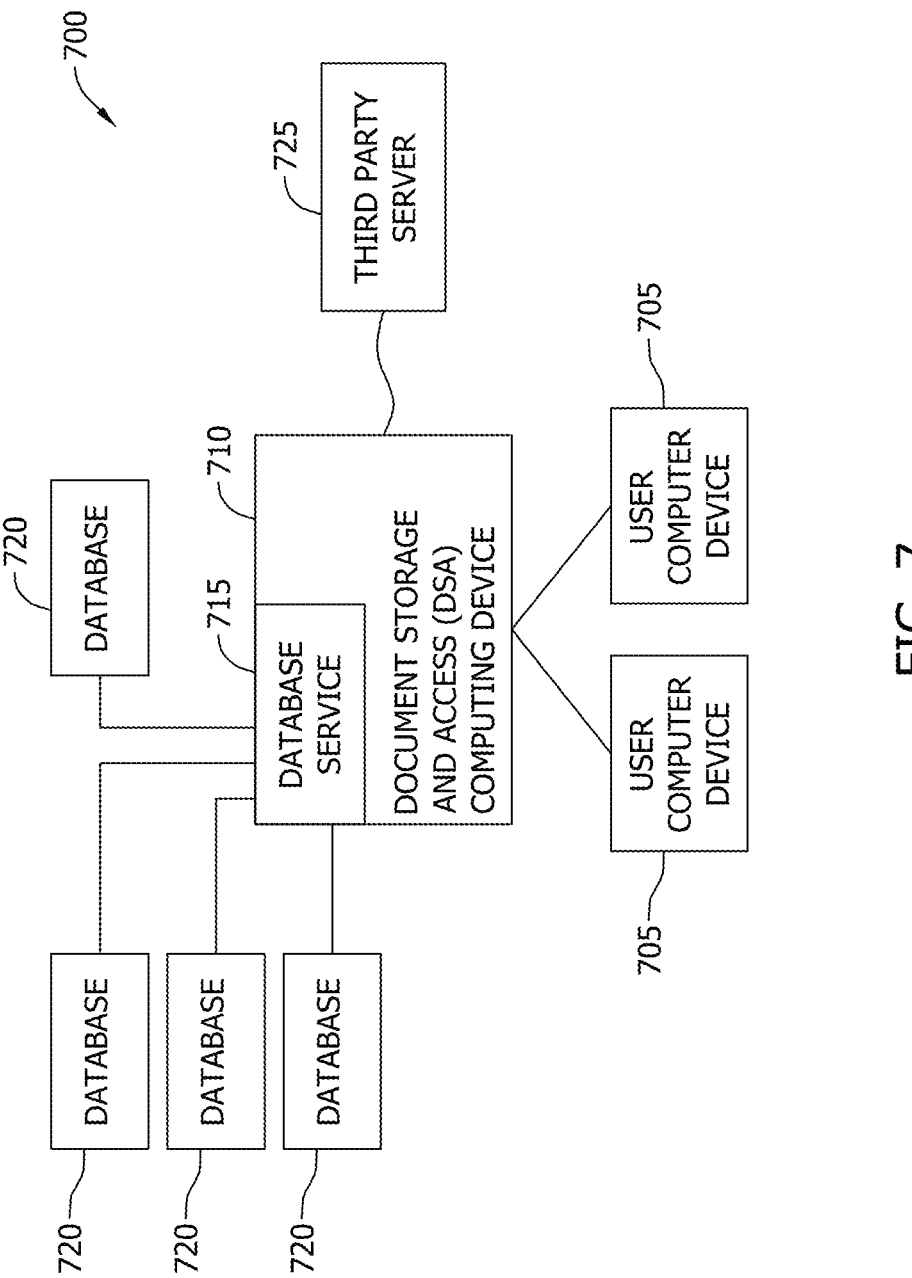
FIG. 7 illustrates a simplified block diagram of an exemplary data storage and access system for knowledge base data in accordance with at least one embodiment.

FIG. 1 is an exemplary screenshot of an example user interface 100 of knowledge base data for a document storage and access system 700 (illustrated in FIG. 7). The user interface (UI) 100 illustrates knowledge base data provided for a specific dataset. The UI 100 includes a data overview section 105, a schema information section 110, a registered consumer list section 115, a use cases (feedback) section 120, and/or a questions & answers section 125.

In the exemplary embodiment, the DSA server 710 (shown in FIG. 7) stores and displays an overview section 105 of each dataset. The overview section 105 includes a plurality of information about the dataset, including, but not limited to, a description of the dataset, date of dataset creation, date dataset was submitted, one or more contacts for the dataset, one or more identifiers for the dataset, current location of the dataset, dataset environment, account information for the dataset, and/or any other information needed for the overview section 105.

In the exemplary embodiment, the DSA server 710 stores and displays a schema section 110 provides information on the schema or arrangement of data in the dataset. For example, a schema section 110 may state a file name and file type, such as a csv (comma separated values) file. The schema section 110 may also describe the fields and field types in the dataset. For example, a dataset may include id stored as a big integer, data stored as a string, city stored as a string, state stored as a string, and max temperature stored as a big integer.

In the exemplary embodiment, the DSA server 710 stores and displays a registered consumer list section 115 (also known as a registered user list section 115). The registered consumer list section 115 displays information about users that have registered to use the dataset. In some embodiments, the registered consumer list section 115 displays the name and/or account of the registered user, when they registered, what they were using the data set for, how many times they used the dataset, and if they are still using the dataset.

In the exemplary embodiments, the DSA server 710 stores and displays a Use Case (also known as Feedback) section 120 is where users can offer feedback and or examples of their usage/experiences with the data. The Use Case (Feedback) section 120 provides examples of how different users used the data and/or provides feedback to data providers and other data users. Frequent users of datasets gain knowledge about datasets that is often never communicated or only communicated through non-public channels. The Use Case (Feedback) section 120 facilitates the sharing of data knowledge between data users. The Use Case (Feedback) section 120 generates and proliferates crowd-sourced ideas. The use Case (Feedback) section 120 shares the lessons of other people's successes and failures.

In some embodiments, the DSA server 710 allows for users to upvote/downvote (thumbs up/thumbs down) use cases and/or feedback. In some further embodiments, the DSA server 710 allows for users to share their code/analysis with other users. In at least one embodiment, the users provide their role, their use case, a description of their use case, and code/product examples generated with this dataset to provide feedback and or examples of their usage/experiences with the data.

One example of use case/feedback may include comments such as "Our team used this dataset to create a dashboard that can be used to easily validate results from some of our other projects. The data is clean and was easy to use."

In the example embodiment, the DSA server 710 stores and displays a Question & Answer section 125 that allows users to ask questions publicly and receive a direct response from the data providers. The Question & Answer section 125 allows users to ask questions regarding datasets and receive answers directly from data providers. In many cases, data users often encounter roadblocks commonly faced by others when wrangling datasets. The Q&A section 125 facilitates a public forum that users can go to ask dataset-specific questions and receive answers directly from data providers (or other data users). Rather than limiting this type of communication to private chats, calls or emails, the DSA server 710 stores and provides the information for all to benefit. The Q&A section 125 breaks down barriers between data users and data providers. The Q&A section 125 also facilitates the sharing of data knowledge between data users. In some embodiments, the DSA server 710 allows any user to answer questions, not just the data provider. In some embodiments, the DSA server 710 data providers and users when a question is asked and/or answered.

One example Q&A set may include: "Q: I noticed that this dataset includes values of −9999 and −7777. What do these values mean?" and "A: −9999 refers to missing data (null values) and −7777 is a non-zero value that would round to zero." Another example Q&A set may include "Q: Is data for Ohio included in this dataset?" and "A: Yes, it is." In some embodiments, the DSA server 710 may allow users to edit and/or delete their questions and/or answers.

In at least one embodiment, the DSA system provides the features described herein by three phases: a data creation phase, a summation phase, and a machine learning (ML) phase. In the data creation phase, the DSA system creates and/or facilitates a public forum for data user. This includes the Question & Answer, the use cases, the code sharing, and the access patterns, as described herein. In the summation phase, the DSA system determines asset insights by aggregating and displaying the findings from the public forum and data mesh to better understand the dataset usage and explore trends. In the ML phase, the DSA system makes recommendations to the users based upon the metadata collected and processed. The ML phase includes using ML to generate recommendations, tag data and metadata, cluster data, and perform sentiment analysis.

Figure 2:
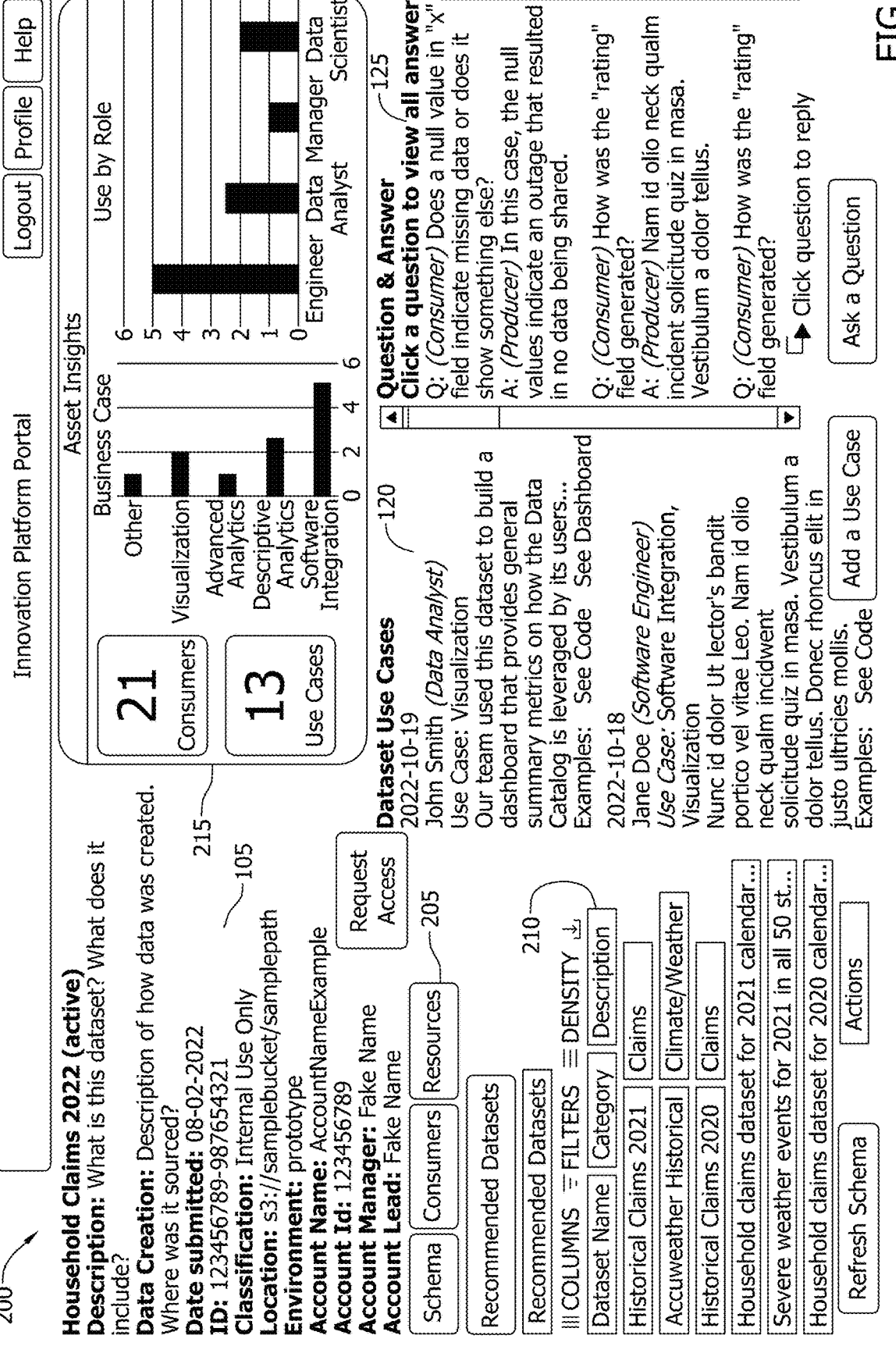
FIG. 2 is an exemplary screenshot of another configuration of the example user interface of knowledge base data for a document storage and access system illustrated in FIG. 7.

FIG. 2 is an exemplary screenshot of another configuration of the example user interface 200 of knowledge base data for a document storage and access system 700 (illustrated in FIG. 7). The UI 200 includes a data overview section 105, a plurality of view options 205, a recommended datasets section 210, an asset insights section 215, a use cases (feedback) section 120, and/or a questions & answers section 125.

In the exemplary embodiment, the DSA server 710 stores and displays a plurality of view options 205, which include buttons and/or tabs that allow the user to switch between viewing different information on the user interface 200. For example, the plurality of view options 205 may include buttons for the schema, consumer, resources, and/or recommended databases. By selecting one of the view option buttons, the DSA server 710 displays the corresponding information. The schema button accesses the schema section 110 (shown in FIG. 1) that displays schema information for the dataset. The consumers button accesses the consumer list 115 (shown in FIG. 1). The resources button displays links/access to helpful resources that enrich the dataset that's being shared provided by the data providers.

In the example embodiment, the DSA server 710 stores and displays a recommended dataset section 210. The recommended dataset section 210 provides a listing of one or more other datasets that the user may find useful. The recommended dataset section 210 may also provide information about these datasets. In one embodiment, the recommended dataset section 210 displays the dataset name, the category, the description, any actions that have been taken on the dataset, and/or any other information as desired and based upon available space. In some embodiments, the DSA server 710 uses data collected to make recommend users new datasets that they might find helpful. The recommended dataset section 210 recommends datasets that other users accessed in conjunction with this dataset. The DSA server 710 may also use the recommended dataset section 210 to recommend datasets that share a similar category or tag (i.e., claims or climate) with the current dataset. In at least one embodiment, the recommended dataset section 210 is generated by machine learning.

The ML Engine data collected by the DSA server 710 to make recommendations to users and/or provide sentiment analysis on feedback. The machine learning engine use ML to process text in Use Cases. In at least one embodiment, the ML engine analyzes the Product Descriptions of different datasets. In another embodiments, the ML engine performs sentiment analysis on the Use Cases. In a further embodiment, the ML engine generates tags/categorize dataset to help generate recommendations for other datasets.

In some embodiments, the DSA server 710 uses machine learning (ML) and artificial intelligence (AI) to explore how the code is being leveraged. In some of these embodiments, the DSA system uses ChatGPT and natural language processing (NLP) to further analyze the code. The DSA system and/or the ML engine determine what languages are used, whether models are built with the data, is the data visualized, is the data summarized, and/or any other questions and/or analysis desired. In at least one embodiment, the DSA server 710 aggregates the findings for display on the UI. The DSA server 710 may also send reports to data providers and/or create recommendations for users.

In the example embodiment, the DSA server 710 stores and displays an Asset Insights section 215, which displays aggregated metadata about dataset usage (Who uses it? How's it used? What services are being used with the data? What does usage look like over time? etc.). The Asset Insights section 215 provides a quick view for providers/users to gain understanding about how datasets are used. The Asset Insights section 215 collects and aggregates metadata about datasets (and their usage). The Asset Insights section 215 uses this information to make recommendations to users. While providing individual-level anecdotes regarding dataset usage is valuable, there is also great benefit to viewing asset usage in aggregation. Analyzing metadata in aggregate can help expedite understanding and lead to more agile work.

The Asset Insights section 215 provides information, such as, but not limited to, who is using the data, how the data is being used, what services are using the data, and to recommend other datasets. In some embodiments, the DSA server 710 may perform sentiment analysis on Use Cases. In additional embodiments, the DSA server 710 may generate tags/categorize dataset to be used for recommendations. In still additional embodiments, the DSA server may automate how the data is being used by leveraging a code analysis system or service, such as, but not limited to, ChatGPT.

Figure 3:
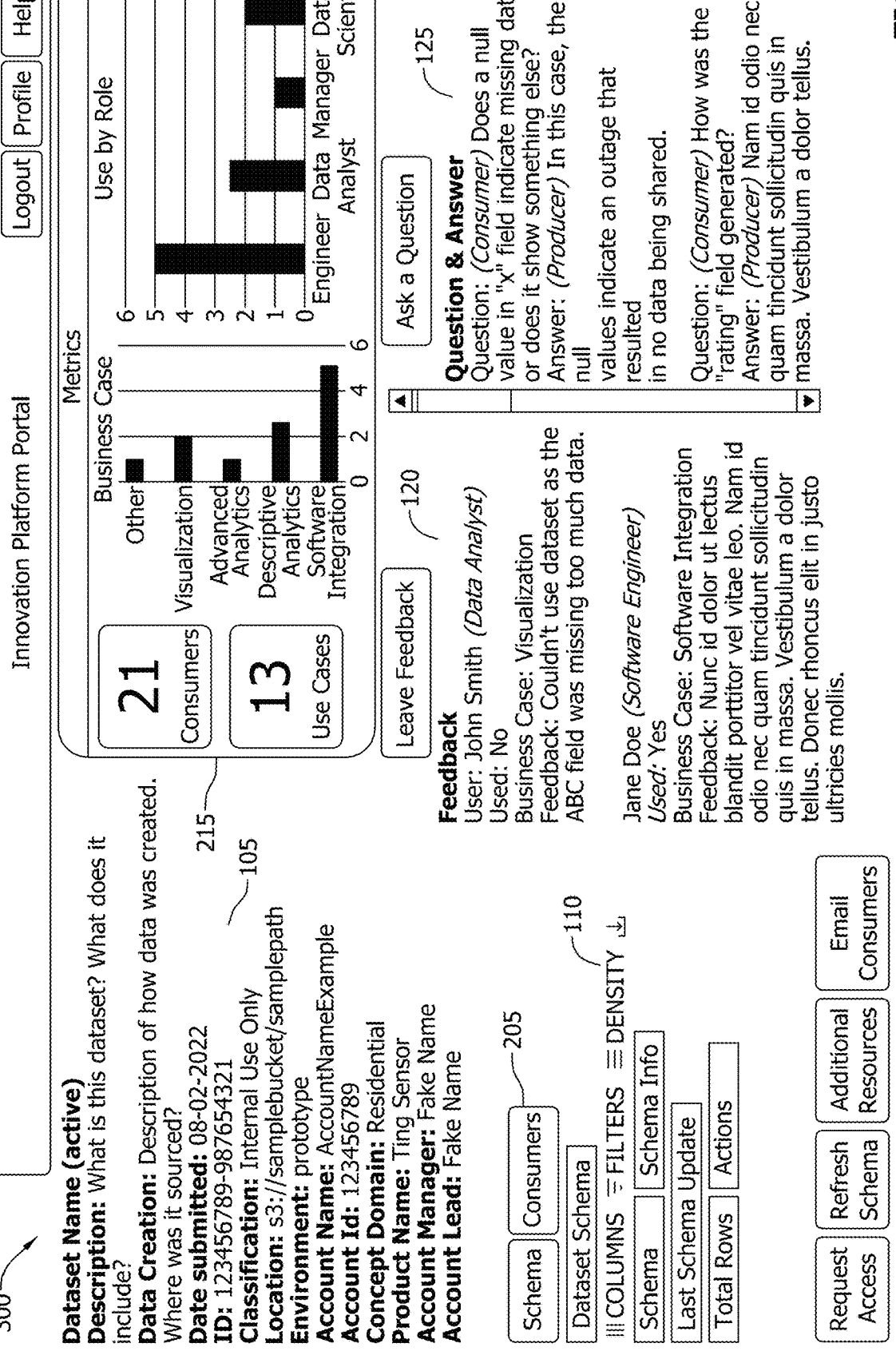
FIG. 3 is an exemplary screenshot of a further configuration of the example user interface of knowledge base data for a document storage and access system illustrated in FIG. 7.

FIG. 3 is an exemplary screenshot of a further configuration of the example user interface 300 of knowledge base data for a document storage and access system 700 (illustrated in FIG. 7). The UI 300 includes a data overview section 105, a plurality of view options 205, a datasets schema section 110, an asset insights section 215, a use cases (feedback) section 120, and/or a questions & answers section 125.

Figure 4:
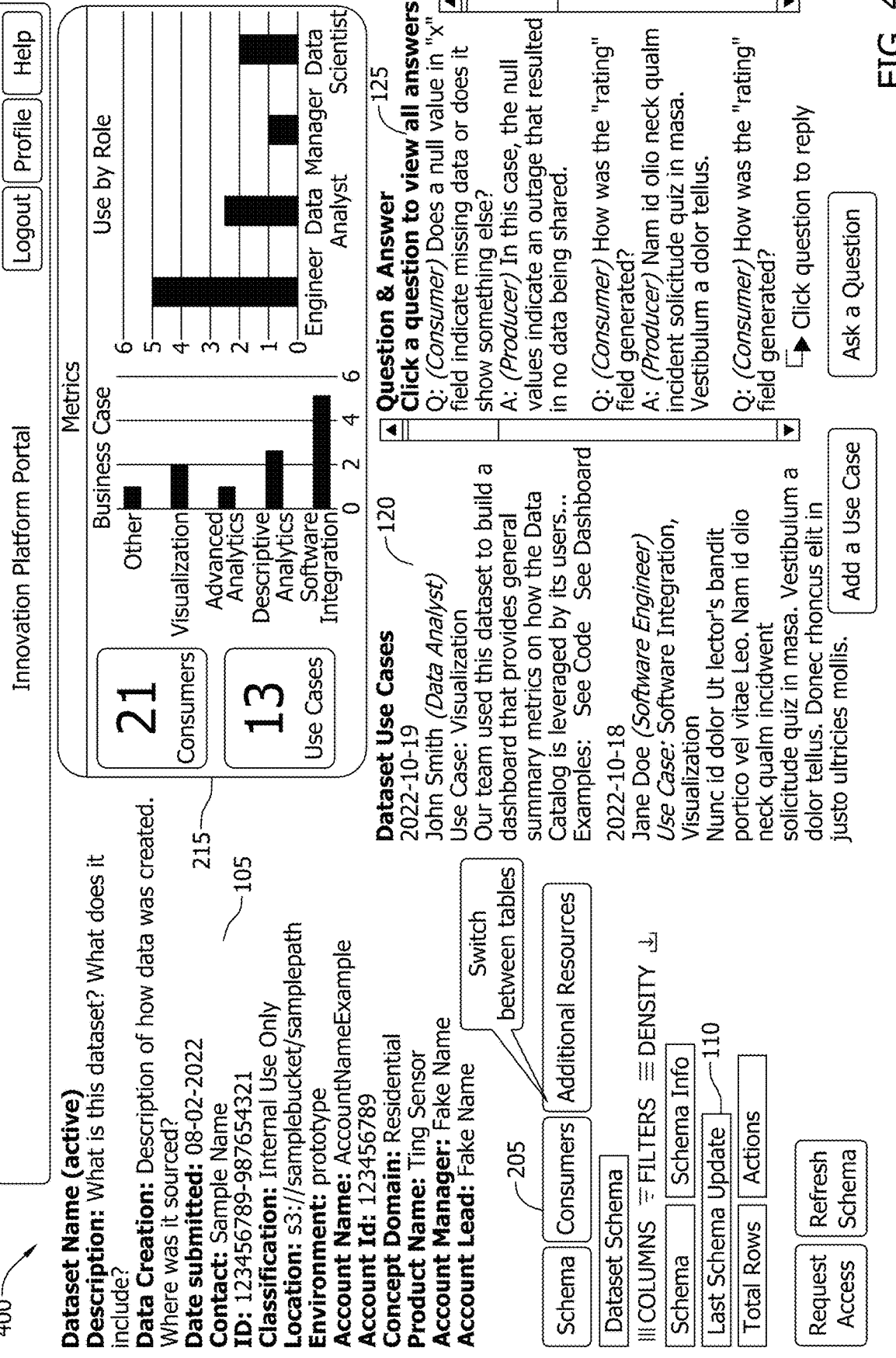
FIG. 4 is an exemplary screenshot of an additional configuration of the example user interface of knowledge base data for a document storage and access system illustrated in FIG. 7.

FIG. 4 is an exemplary screenshot of an additional example user interface 400 of knowledge base data for a document storage and access system 700 (illustrated in FIG. 7). The UI 400 includes a data overview section 105, a plurality of view options 205, a datasets schema section 110, an asset insights section 215, a use cases (feedback) section 120, and/or a questions & answers section 125.

Figure 5:
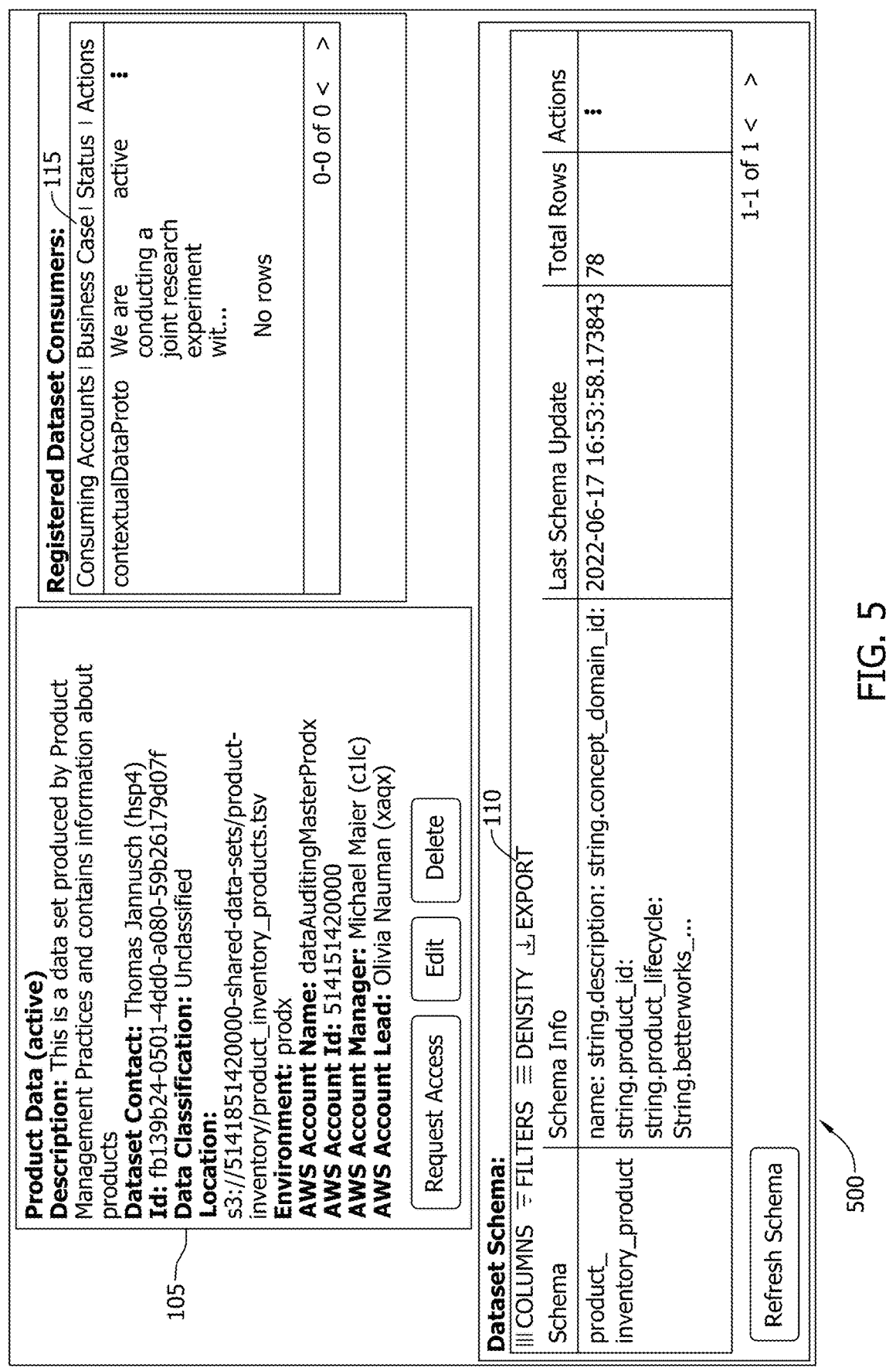
FIG. 5 is an exemplary screenshot of still another configuration of the example user interface of knowledge base data for a document storage and access system illustrated in FIG. 7.

FIG. 5 is an exemplary screenshot of still another example user interface 500 of knowledge base data for a document storage and access system 700 (illustrated in FIG. 7). The UI 500 includes a data overview section 105, a datasets schema section 110, and/or a registered consumers list section 115.

Figure 6:
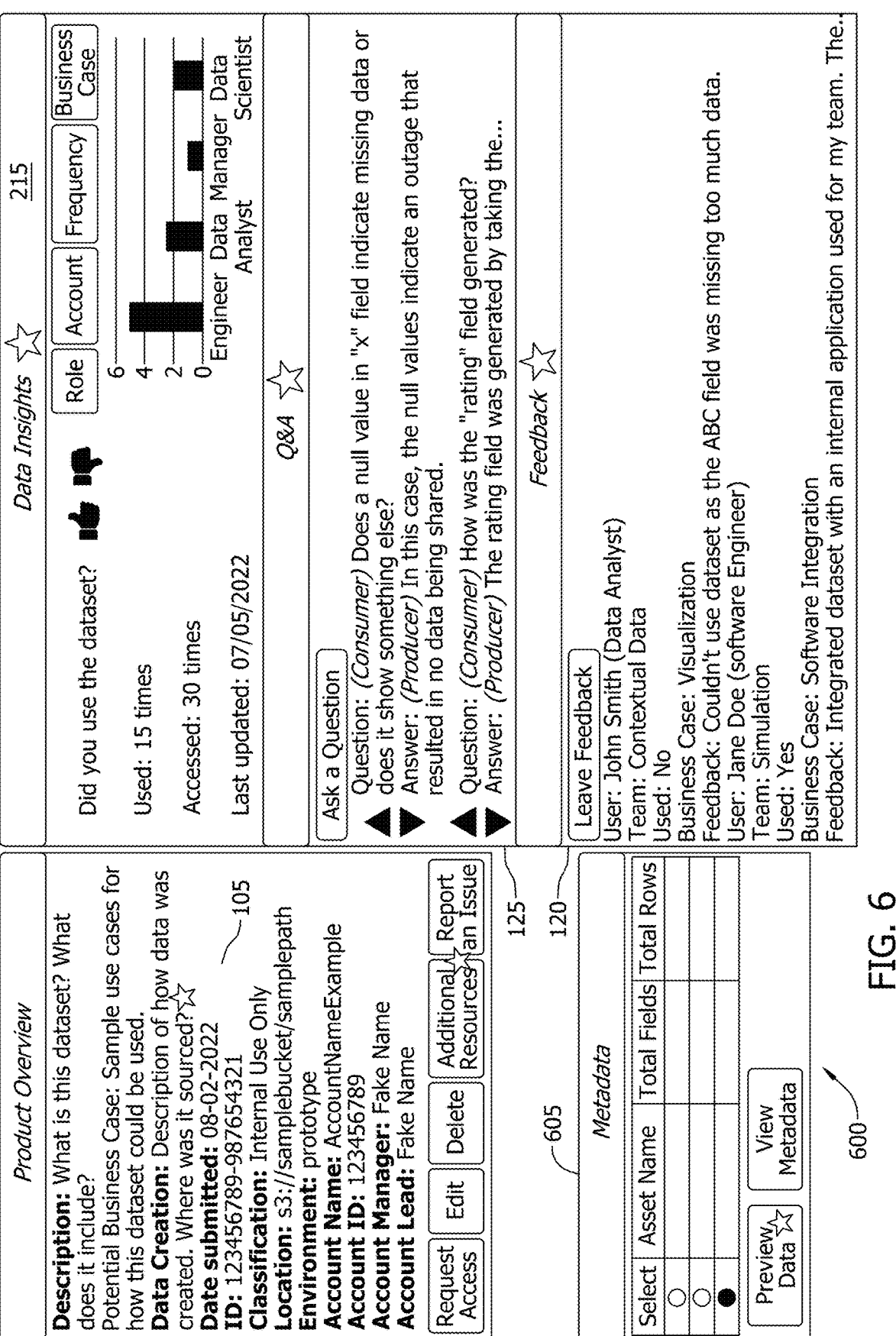
FIG. 6 is an exemplary screenshot of yet another configuration of the example user interface of knowledge base data for a document storage and access system illustrated in FIG. 7.

FIG. 6 is an exemplary screenshot of yet another example user interface 600 of knowledge base data for a document storage and access system 700 (illustrated in FIG. 7). The UI 600 includes a data overview section 105, a metadata section 605, an asset insights section 215, a questions & answers section 125, and/or a use cases (feedback) section 120.

Exemplary Computer Network

FIG. 7 depicts a simplified block diagram of an exemplary data storage and access system 700 for knowledge base data in accordance with at least one embodiment. In the exemplary embodiment, system 700 may be used for advanced enterprise data storage and retrieval including knowledge base data. A data storage and access system 700, as described herein, may include a Data Storage and Access ("DSA") server 710 that is in communication with a plurality of user computer devices 705. In the exemplary embodiment, one or more user's desire to store datasets for other user's use. The user may wish to annotate the knowledge base data for the dataset with additional information to help users to determine whether or not this dataset will be useful.

As described herein in more detail, a Data Storage and Access ("DSA") server 710 may be configured to (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4) receive, from the user computer device, a request for access to the first dataset, wherein the request for access includes one or more database operations to be performed on the first dataset; (5) access, via a first database server, the first dataset; and/or (6) execute the one or more database operations on the first dataset to provide results to the user computer device.

In the exemplary embodiment, user computer devices 705 are computers that include a web browser or a software application, which enables user computer devices 705 to access DSA server 710 and the knowledge base data using the Internet. More specifically, user computer devices 705 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

User computer devices 705 may be any device capable of accessing the Internet including, but not limited to, a mobile device, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), or XR (extended reality) headsets or glasses), chat bots, or other web-based connectable equipment or mobile devices.

A database server 715 may be communicatively coupled to a plurality of databases 720 that stores data. In one embodiment, database 720 may include datasets and knowledge base data about the datasets. In the exemplary embodiment, the datasets are stored in a plurality of databases 720. In these embodiments, the plurality of databases 720 may be associated with different departments and/or divisions of an enterprise. In the exemplary embodiment, database(s) 720 may be stored remotely from DSA server 710. In some embodiments, database(s) 720 may be decentralized. In the exemplary embodiment, a person may access database(s) 720 via user computer devices 705 by logging onto DSA server 710, as described herein.

DSA server 710 may be communicatively coupled with one or more the user computer devices 705. In some embodiments, DSA server 710 may be associated with, or is part of a computer network associated with an enterprise, or in communication with the enterprise's computer network (not shown). In other embodiments, DSA server 710 may be associated with a third party and is merely in communication with the enterprise's computer network.

Third-party servers 725 may be any third-party server that DSA server 710 is in communication with that provides additional functionality and/or information to DSA server 710. For example, third-party server 725 may provide code, knowledge base data, and/or other information.

In the exemplary embodiment, third-party servers 725 are computers that include a web browser or a software application, which enables third-party servers 725 to communicate with DSA server 710 using the Internet, a local area network (LAN), or a wide area network (WAN). In some embodiments, the third-party servers 725 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Third-party servers 725 can be any device capable of accessing a network, such as the Internet, including, but not limited to, a desktop computer, a laptop computer, a personal digital assistant (PDA), a cellular phone, a smartphone, a tablet, a phablet, wearable electronics, smart watch, virtual headsets or glasses (e.g., AR (augmented reality), VR (virtual reality), MR (mixed reality), or XR (extended reality) headsets or glasses), chat bots, voice bots, ChatGPT bots or ChatGPT-based bots, or other web-based connectable equipment or mobile devices.

Exemplary Client Device

Figure 8:
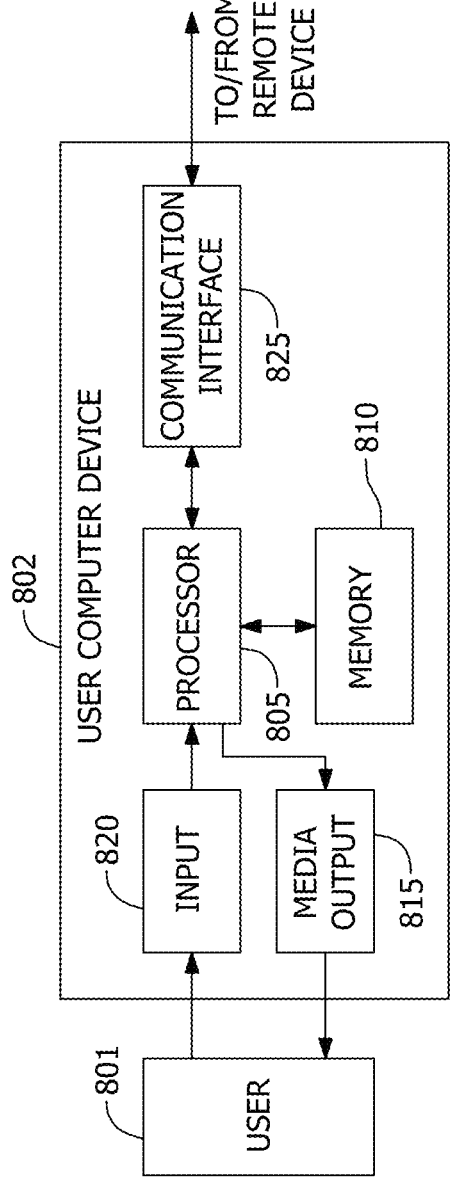
FIG. 8 illustrates an exemplary configuration of a client computer device shown in FIG. 7, in accordance with one embodiment of the present disclosure.

FIG. 8 depicts an exemplary configuration of a user computer device 705 shown in FIG. 7, in accordance with one embodiment of the present disclosure. User computer device 802 may be operated by a user 801. User computer device 802 may include, but is not limited to, user computer devices 705 (shown in FIG. 7). User computer device 802 may include a processor 805 for executing instructions. In some embodiments, executable instructions are stored in a memory area 810. Processor 805 may include one or more processing units (e.g., in a multi-core configuration). Memory area 810 may be any device allowing information such as executable instructions and/or transaction data to be stored and retrieved. Memory area 810 may include one or more computer readable media.

User computer device 802 may also include at least one media output component 815 for presenting information to user 801. Media output component 815 may be any component capable of conveying information to user 801. In some embodiments, media output component 815 may include an output adapter (not shown) such as a video adapter and/or an audio adapter. An output adapter may be operatively coupled to processor 805 and operatively coupleable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (eXtended Reality) headsets).

In some embodiments, media output component 815 may be configured to present a graphical user interface (e.g., a web browser and/or a client application) to user 801. A graphical user interface may include, for example, an online interface for viewing and/or uploading knowledge base data. In some embodiments, user computer device 802 may include an input device 820 for receiving input from user 801. User 801 may use input device 820 to, without limitation, select and/or enter one or more items of knowledge base data to upload and/or view.

Input device 820 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 815 and input device 820.

User computer device 802 may also include a communication interface 825, communicatively coupled to a remote device such as the DSA server 710 (shown in FIG. 7). Communication interface 825 may include, for example, a wired or wireless network adapter and/or a wireless data transceiver for use with a mobile telecommunications network.

Stored in memory area 810 are, for example, computer readable instructions for providing a user interface to user 801 via media output component 815 and, optionally, receiving and processing input from input device 820. A user interface may include, among other possibilities, a web browser and/or a client application. Web browsers enable users, such as user 801, to display and interact with media and other information typically embedded on a web page or a website from the DSA server 710 and/or the third-party server 725. A client application allows user 801 to interact with, for example, the DSA server 710 and/or the third-party server 725. For example, instructions may be stored by a cloud service, and the output of the execution of the instructions sent to the media output component 815.

Processor 805 executes computer-executable instructions for implementing aspects of the disclosure. In some embodiments, the processor 805 is transformed into a special purpose microprocessor by executing computer-executable instructions or by otherwise being programmed.

Exemplary Server Device

Figure 9:
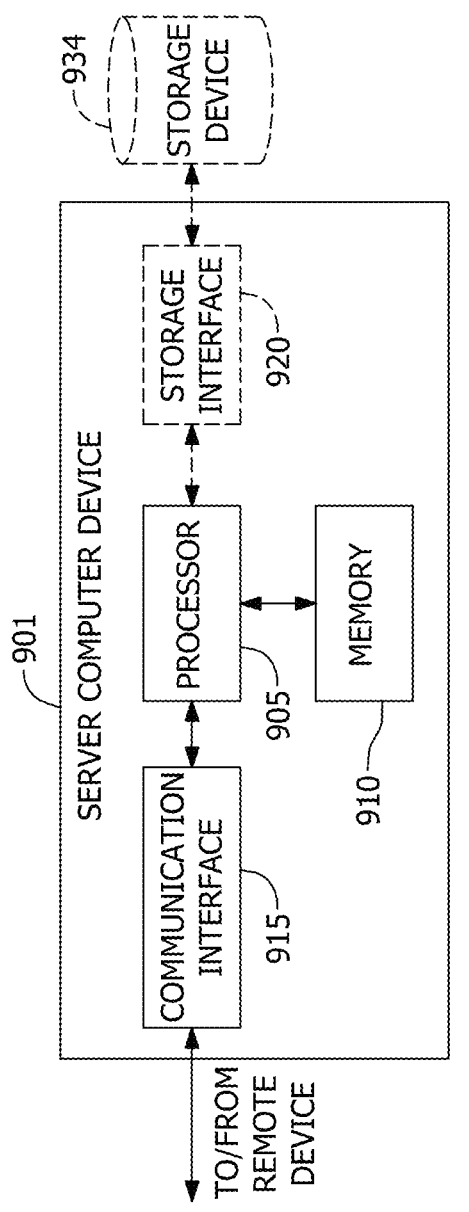
FIG. 9 illustrates an exemplary configuration of a server shown in FIG. 7, in accordance with one embodiment of the present disclosure.

FIG. 9 depicts an exemplary configuration of a server 710 shown in FIG. 7, in accordance with one embodiment of the present disclosure. Server computer device 901 may include, but is not limited to, database server 715, DSA server 710, and third-party server 725 (all shown in FIG. 7). Server computer device 901 may also include a processor 905 for executing instructions. Instructions may be stored in a memory area 910. Processor 905 may include one or more processing units (e.g., in a multi-core configuration).

Processor 905 may be operatively coupled to a communication interface 915 such that server computer device 901 is capable of communicating with a remote device such as another server computer device 901, third-party server 725, or user computer devices 705 (shown in FIG. 7). For example, communication interface 915 may receive requests from user computer devices 705 via the Internet, as illustrated in FIG. 7.

Processor 905 may also be operatively coupled to a storage device 934. Storage device 934 may be any computer-operated hardware suitable for storing and/or retrieving data, such as, but not limited to, data associated with database 720 (shown in FIG. 7). In some embodiments, storage device 934 may be integrated in server computer device 901. For example, server computer device 901 may include one or more hard disk drives as storage device 934.

In other embodiments, storage device 934 may be external to server computer device 901 and may be accessed by a plurality of server computer devices 901. For example, storage device 934 may include a storage area network (SAN), a network attached storage (NAS) system, and/or multiple storage units such as hard disks and/or solid-state disks in a redundant array of inexpensive disks (RAID) configuration.

In some embodiments, processor 905 may be operatively coupled to storage device 934 via a storage interface 920. Storage interface 920 may be any component capable of providing processor 905 with access to storage device 934. Storage interface 920 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 905 with access to storage device 934.

Processor 905 may execute computer-executable instructions for implementing aspects of the disclosure. In some embodiments, the processor 905 may be transformed into a special purpose microprocessor by executing computer-executable instructions or by otherwise being programmed. For example, the processor 905 may be programmed with the instructions such as illustrated in FIGS. 5 and 10.

In one example embodiment, the information may include, but is not limited to, family memories, family stories, family recipes, important documents, videos and audio of different family members telling stories, photographs with the subjects identified, and/or other family information.

Exemplary Database Listing

FIG. 10 illustrates an exemplary dataset listing 1000 of knowledge base data for the data storage and access system 700 (shown in FIG. 7). Dataset listing 1000 shows a plurality of knowledge base data about a plurality of datasets that may be stored and/or managed by the DSA system 700 as described herein. The dataset listing 1000 includes and displays a plurality of fields of knowledge base data including, but not limited to, dataset name 1005, description 1010, status 1015, contact 1020, account 1025, environment 1030, number of consumers 1035, number of actions 1040, and/or any other information needed for the systems and methods described herein.

Exemplary Process for Advanced Enterprise Data Storage and Retrieval

Figure 11:
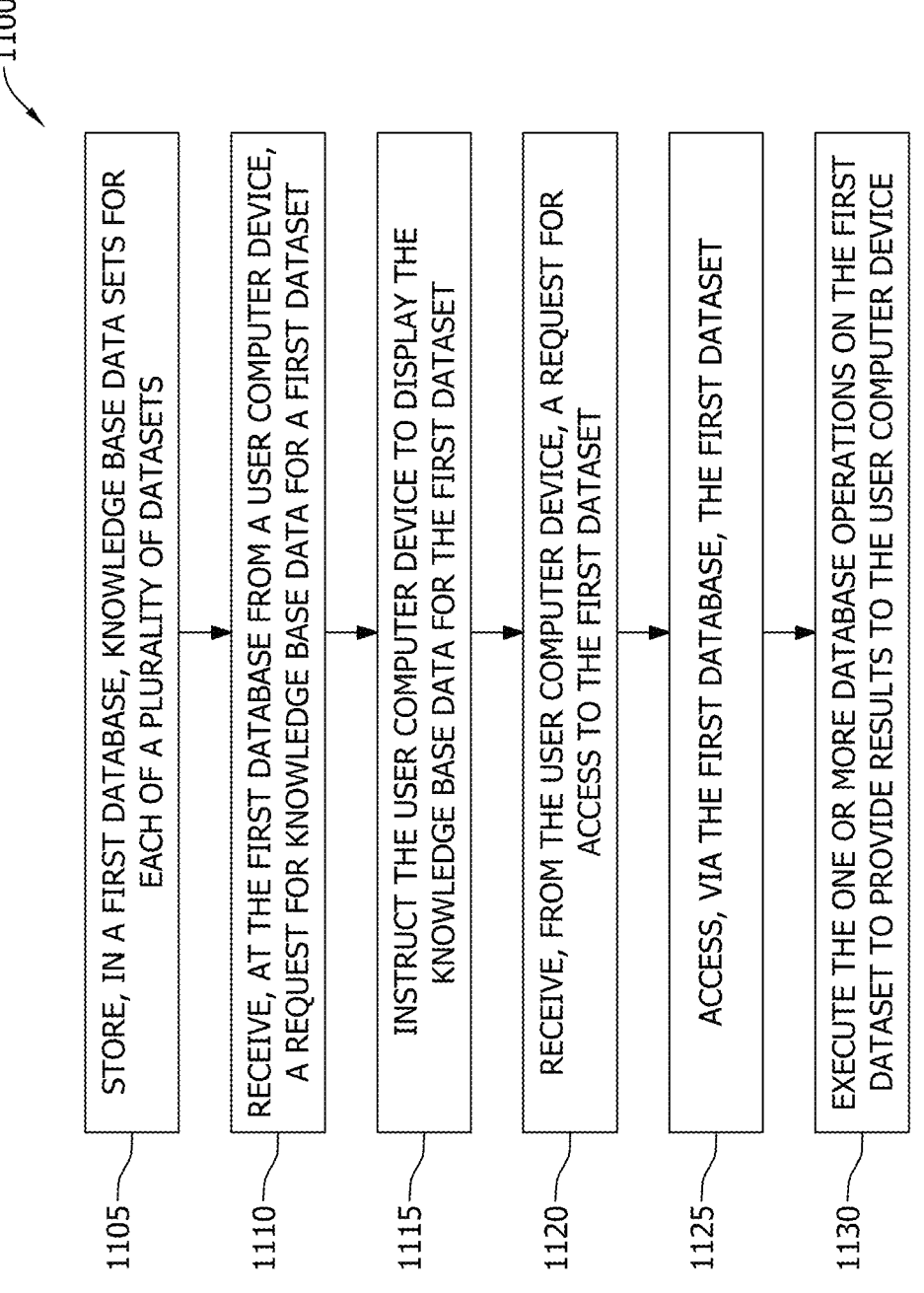
FIG. 11 illustrates an exemplary computer-implemented method of advanced enterprise data storage and retrieval for knowledge base data using the data storage and access system shown in FIG. 7.

FIG. 11 illustrates an exemplary computer-implemented method 1100 of advanced enterprise data storage and retrieval for knowledge base data using the data storage and access system 700 (shown in FIG. 7). The computer-implemented method 1100 may be implemented via one or more processors, transceivers, servers, sensors, applications, mobile applications, chatbots (or voice-bots), and related technologies. In some embodiments, method 1100 may be carried out by the data storage and access (DSA) server 710 (shown in FIG. 7).

In the exemplary embodiment, the DSA server 710 stores 1105, in a first database 720 (shown in FIG. 7), knowledge base data sets for each of a plurality of datasets. Each knowledge base data set includes at least data relating to the use of the associated dataset and a link to a separate database storing the corresponding dataset.

In the exemplary embodiment, the DSA server 710 receives 1110, at the first database 720 from a user computer device 705 (shown in FIG. 7), a request for knowledge base data for a first dataset.

In the exemplary embodiment, the DSA server 710 instructs 1115 the user computer device 705 to display the knowledge base data for the first dataset.

In the exemplary embodiment, the DSA server 710 receives 1120, from the user computer device 705, a request for access to the first dataset. The request for access includes one or more database operations to be performed on the first dataset.

In the exemplary embodiment, the DSA server 710 accesses 1125, via the first database 720, the first dataset.

In the exemplary embodiment, the DSA server 710 executes 1130 the one or more database operations on the first dataset to provide results to the user computer device 705.

In some embodiments, the knowledge base data may also include a plurality of overview information for the corresponding dataset. In these embodiments, the DSA server 710 may instruct 1115 the user computer device 705 to display the plurality of overview information for the first dataset.

In further embodiments, the knowledge base data may also include a schema for the corresponding dataset. In these embodiments, the DSA server 710 may instruct 1115 the user computer device to display the schema for the first dataset. Additionally or alternatively, the knowledge base data may also include a list of consumers who have accessed the corresponding dataset. In still further embodiments, the knowledge base data may also include one or more use cases where other users accessed the corresponding dataset.

In some further embodiments, the DSA server 710 may receive, via the user computer device 705, a question about the first dataset. The DSA server 710 may route the question to a computer device 705 associated with a data provider associated with the first dataset. The DSA server 710 may receive a response for the question from the computer device 705 associated with a data provider associated with the first dataset. The DSA server 710 may provide the response to the user computer device 705. The DSA server 710 may also store the question and the response in the knowledge base data for the first dataset.

In still further embodiments, the knowledge base data includes a plurality of questions and answers. The DSA server 710 may also instruct 1115 the user computer device 705 to display the questions and answers for the first dataset.

In additional embodiments, the DSA server 710 may analyze usage of the plurality of datasets to generate a plurality of usage information for the plurality of datasets. The DSA server 710 may also analyze the plurality of usage information to generate a recommendation model trained to provide one or more dataset recommendations based upon each dataset and the plurality of usage information. The DSA server 710 may further execute the recommendation model to generate one or more first dataset recommendations based upon the first dataset. Additionally, the DSA server 710 may instruct the user computer device to display the one or more first dataset recommendations for the first dataset.

Exemplary Embodiments & Functionality

In one embodiment, a computer system for advanced enterprise data storage and retrieval may be provided. The computer system may (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4) receive, from the user computer device, a request for access to the first dataset, wherein the request for access includes one or more database operations to be performed on the first dataset; (5) access, via a first database server, the first dataset; and/or (6) execute the one or more database operations on the first dataset to provide results to the user computer device. The computer system may have additional, less, or alternate functionality, including that discussed elsewhere herein.

In some further enhancements, the knowledge base data also includes a plurality of overview information for the corresponding dataset and the computer system may instruct the user computer device to display the plurality of overview information for the first dataset.

In some further enhancements, the knowledge base data also includes a schema for the corresponding dataset and the computer system may instruct the user computer device to display the schema for the first dataset. Additionally or alternatively, the knowledge base data also includes a list of consumers who have accessed the corresponding dataset. In additional enhancements, the knowledge base data also includes one or more use cases where other users accessed the corresponding dataset.

In some further enhancements, the computer system may receive, via the user computer device, a question about the first dataset. The computer system may also route the question to a computer device associated with a data provider associated with the first dataset. The computer system may further receive a response for the question from the computer device associated with a data provider associated with the first dataset. In addition, the computer system may provide the response to the user computer device.

In some further enhancements, the computer system may store the question and the response in the knowledge base data for the first dataset. Additionally or alternatively, the knowledge base data may include a plurality of questions and answers, and the computer system may instruct the user computer device to display the questions and answers for the first dataset.

In some further enhancements, the computer system may analyze usage of the plurality of datasets to generate a plurality of usage information for the plurality of datasets. The computer system may also analyze the plurality of usage information to generate a recommendation model trained to provide one or more dataset recommendations based upon each dataset and the plurality of usage information. In addition, the computer system may execute the recommendation model to generate one or more first dataset recommendations based upon the first dataset. Moreover, the computer system may instruct the user computer device to display the one or more first dataset recommendations for the first dataset.

In another aspect, the present embodiments may relate to a computer-implemented method for advanced enterprise data storage and retrieval. The method may include, such as via one or more local or remote processors, transceivers, and memory units, configured for wireless communication and/or data transmission over one or more radio frequency links: (1) storing, in a first database, knowledge base data sets for each of a plurality of datasets, wherein each knowledge base data set includes at least data relating to the use of the associated dataset and a link to a separate database storing the corresponding dataset; (2) receiving, at the first database from a user computer device, a request for knowledge base data for a first dataset; (3) instructing the user computer device to display the knowledge base data for the first dataset; (4) receiving, from the user computer device, a request for access to the first dataset, wherein the request for access includes one or more database operations to be performed on the first dataset; (5) accessing, via a first database server, the first dataset; and/or (6) executing the one or more database operations on the first dataset to provide results to the user computer device. The method may include additional, less, or alternate actions, including those discussed elsewhere herein.

In another aspect, at least one non-transitory computer-readable media having computer-executable instructions embodied thereon may be provided. When executed by a computing device including at least one processor in communication with at least one memory device, the computer-executable instructions may cause the at least one processor to: (1) store, in a first database, knowledge base data sets for each of a plurality of datasets, wherein each knowledge base data set includes at least data relating to the use of the associated dataset and a link to a separate database storing the corresponding dataset; (2) receive, at the first database from a user computer device, a request for knowledge base data for a first dataset; (3) instruct the user computer device to display the knowledge base data for the first dataset; (4) receive, from the user computer device, a request for access to the first dataset, wherein the request for access includes one or more database operations to be performed on the first dataset; (5) access, via a first database server, the first dataset; and/or (6) execute the one or more database operations on the first dataset to provide results to the user computer device. The computer-executable instructions may direct additional, less, or alternate functionality, including that discussed elsewhere herein.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, data usage numbers, and/or knowledge base data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract relevant information for users from mobile device sensors, vehicle-mounted sensors, home-mounted sensors, and/or other sensor data, vehicle or home telematics data, image data, audio data, and/or other data.

Certain embodiments may employ one or more voice bots, chatbots, ChatGPT bots, or other bots, such as for inputting, outputting, editing, or revising content, such as images or videos. For instance, the voice bot or chatbot may employ supervised or unsupervised ML techniques, which may be followed by, and/or used in conjunction with, reinforced or reinforcement learning techniques. The voice bot or chatbot may also employ the techniques utilized for ChatGPT.

In one embodiment, a processing element may be trained by providing it with a large sample of conventional analog and/or digital, still and/or moving (i.e., video) image data, telematics data, and/or other data of belongings, household goods, durable goods, appliances, electronics, homes, etc. with known characteristics or features. Such information may include, for example, make or manufacturer and model information.

Based upon these analyses, the processing element may learn how to identify characteristics and patterns that may then be applied to analyzing sensor data, vehicle or home telematics data, image data, mobile device data, and/or other data. For example, the processing element may learn, with the user's permission or affirmative consent, to identify the faces of individuals in images and/or video.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In one exemplary embodiment, the system is executed on a single computer system, without requiring a connection to a server computer. In a further exemplary embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system comprising at least one processor in communication with at least one memory device, wherein the at least one processor is programmed to:

generate knowledge base data for each of a plurality of pre-defined structured datasets, wherein the knowledge base data includes metadata describing a respective pre-defined structured dataset, the metadata including data associated with a previous access instance of the respective pre-defined structured dataset and a link to a separate database storing the respective pre-defined structured dataset;

store, in a first database, the knowledge base data for each of the plurality of pre-defined structured datasets, receive, at the first database from a user computer device, a request for knowledge base data for a first pre-defined structured dataset;

instruct the user computer device to display the knowledge base data for the first pre-defined structured dataset, including an indicator of the previous access instance of the first pre-defined structured dataset;

receive, from the user computer device, a request for access to the first pre-defined structured dataset, wherein the request for access includes one or more database operations to be performed on the first pre-defined structured dataset;

access, via a first database server, the first pre-defined structured dataset; and execute the one or more database operations on the first pre-defined structured dataset to provide results to the user computer device.

2. The computer system of claim 1, wherein the knowledge base data also includes a plurality of overview information for the respective pre-defined structured dataset, and wherein the at least one processor is further programmed to instruct the user computer device to display the plurality of overview information for the first enterprise dataset.

3. The computer system of claim 1, wherein the knowledge base data also includes a schema defining a format of the respective pre-defined structured dataset, and wherein the at least one processor is further programmed to instruct the user computer device to display the schema for the first pre-defined structured dataset.

4. The computer system of claim 1, wherein the knowledge base data also includes a list of users registered with the computer system who have accessed the respective pre-defined structured dataset in one or more previous access instances.

5. The computer system of claim 1, wherein the metadata includes user feedback associated with the respective pre-defined structured dataset for the previous access instance.

6. The computer system of claim 1, wherein the at least one processor is further programmed to:

receive, via the user computer device, a question about the first pre-defined structured dataset;

route the question to a computer device associated with a data provider associated with the first pre-defined structured dataset;

receive a response for the question from the computer device associated with a data provider associated with the first pre-defined structured dataset; and provide the response to the user computer device.

7. The computer system of claim 6, wherein the at least one processor is further programmed to store the question and the response in the knowledge base data for the first pre-defined structured dataset.

8. The computer system of claim 1, wherein the knowledge base data includes a plurality of questions and answers, and wherein the at least one processor is further programmed to instruct the user computer device to display the questions and answers for the first pre-defined structured dataset.

9. The computer system of claim 1, wherein the at least one processor is further programmed to analyze usage of the plurality of pre-defined structured datasets to generate a plurality of usage information for the plurality of pre-defined structured datasets.

10. The computer system of claim 9, wherein the at least one processor is further programmed to analyze the plurality of usage information to generate a recommendation model trained to provide one or more dataset recommendations based upon each pre-defined structured dataset and the plurality of usage information.

11. The computer system of claim 10, wherein the at least one processor is further programmed to:

execute the recommendation model to generate one or more first dataset recommendations based upon the first pre-defined structured dataset; and instruct the user computer device to display the one or more first dataset recommendations for the first pre-defined structured dataset.

12. A computer-implemented method performed by a computer system including at least one processor in communication with at least one memory device, the computer-implemented method comprising:

generating knowledge base data for each of a plurality of pre-defined structured datasets, wherein the knowledge base data includes metadata describing a respective pre-defined structured dataset, the metadata including data associated with a previous access instance of the respective pre-defined structured dataset and a link to a separate database storing the respective pre-defined structured dataset;

storing, in a first database, the knowledge base data for each of the plurality of pre-defined structured datasets;

receiving, at the first database from a user computer device, a request for knowledge base data for a first pre-defined structured dataset;

instructing the user computer device to display the knowledge base data for the first pre-defined structured dataset, including an indicator of the previous access instance of the first pre-defined structured dataset;

receiving, from the user computer device, a request for access to the first pre-defined structured dataset, wherein the request for access includes one or more database operations to be performed on the first pre-defined structured dataset;

accessing, via a first database server, the first pre-defined structured dataset; and executing the one or more database operations on the first pre-defined structured dataset to provide results to the user computer device.

13. The computer-implemented method of claim 12, wherein the knowledge base data also includes a plurality of overview information for the respective pre-defined structured dataset, and wherein the method further comprises instructing the user computer device to display the plurality of overview information for the first pre-defined structured dataset.

14. The computer-implemented method of claim 12, wherein the knowledge base data also includes a schema defining a format of the respective pre-defined structured dataset, and wherein the method further comprises instructing the user computer device to display the schema for the first pre-defined structured dataset.

15. The computer-implemented method of claim 12, wherein the knowledge base data also includes a list of users registered with the computer system who have accessed the respective pre-defined structured dataset in one or more previous access instances.

16. The computer-implemented method of claim 12, wherein the metadata includes user feedback associated with the respective pre-defined structured dataset for the previous access instance.

17. The computer-implemented method of claim 12 further comprising:

receiving, via the user computer device, a question about the first pre-defined structured dataset;

routing the question to a computer device associated with a data provider associated with the first pre-defined structured dataset;

receiving a response for the question from the computer device associated with a data provider associated with the first pre-defined structured dataset; and providing the response to the user computer device.

18. The computer-implemented method of claim 17 further comprising storing the question and the response in the knowledge base data for the first pre-defined structured dataset.

19. The computer-implemented method of claim 12, wherein the knowledge base data includes a plurality of questions and answers, and wherein the method further comprises instructing the user computer device to display the questions and answers for the first pre-defined structured dataset.

20. The computer-implemented method of claim 12 further comprising analyzing usage of the plurality of pre-defined structured datasets to generate a plurality of usage information for the plurality of pre-defined structured datasets.

21. The computer-implemented method of claim 20 further comprising analyzing the plurality of usage information to generate a recommendation model trained to provide one or more dataset recommendations based upon each pre-defined structured dataset and the plurality of usage information.

22. The computer-implemented method of claim 21 further comprising:

execute the recommendation model to generate one or more first dataset recommendations based upon the first pre-defined structured dataset; and instructing the user computer device to display the one or more first dataset recommendations for the first pre-defined structured dataset.

23. A non-transitory computer-readable media having computer-executable instructions embodied thereon, wherein when executed by a computing device including at least one processor in communication with at least one memory device, the computer-executable instructions cause the at least one processor to:

generate knowledge base data for each of a plurality of pre-defined structured datasets, wherein the knowledge base data includes metadata describing an respective pre-defined structured dataset, the metadata including data associated with a previous access instance of the respective pre-defined structured dataset and a link to a separate database storing the respective pre-defined structured dataset;

store, in a first database, the knowledge base data for each of the plurality of pre-defined structured datasets;

receive, at the first database from a user computer device, a request for knowledge base data for a first pre-defined structured dataset;

instruct the user computer device to display the knowledge base data for the first pre-defined structured dataset, including an indicator of the previous access instance of the first pre-defined structured dataset;

receive, from the user computer device, a request for access to the first pre-defined structured dataset, wherein the request for access includes one or more database operations to be performed on the first pre-defined structured dataset;

access, via a first database server, the first pre-defined structured dataset; and execute the one or more database operations on the first pre-defined structured dataset to provide results to the user computer device.

* * * * *